US012056862B2

United States Patent
Tseng et al.

(10) Patent No.: US 12,056,862 B2
(45) Date of Patent: Aug. 6, 2024

(54) SHADING CORRECTING METHOD AND SHADING CORRECTING DEVICE FOR REAL-TIME IMAGE

(71) Applicant: ML TECHNOLOGY LTD., New Taipei (TW)

(72) Inventors: Ying-Chang Tseng, New Taipei (TW); Hung-Chieh Shy, New Taipei (TW)

(73) Assignee: ML TECHNOLOGY LTD., New Taipei (TW)

( * ) Notice: Subject to any disclaimer, the term of this patent is extended or adjusted under 35 U.S.C. 154(b) by 362 days.

(21) Appl. No.: 17/536,008

(22) Filed: Nov. 27, 2021

(65) Prior Publication Data

US 2022/0253989 A1  Aug. 11, 2022

Related U.S. Application Data (60) Provisional application No. 63/147,211, filed on Feb. 8, 2021.

(51) Int. Cl.
*G06T 5/92* (2024.01)
*G06T 1/60* (2006.01)
(Continued)

(52) U.S. Cl.
CPC .................. *G06T 5/92* (2024.01); *G06T 1/60* (2013.01); *G06T 3/4092* (2013.01); *G06T 3/60* (2013.01);
(Continued)

(58) Field of Classification Search
CPC .... G06T 5/00; G06T 5/20; G06T 5/50; G06T 5/92; G06T 5/94; G06T 7/0002;
(Continued)

(56) References Cited

U.S. PATENT DOCUMENTS

2008/0246848 A1* 10/2008 Tsubaki ................... G06T 7/20
   348/208.4
2009/0002400 A1   1/2009 Ha et al.
(Continued)

FOREIGN PATENT DOCUMENTS

WO   WO-2020136731 A1 *  7/2020   .......... G09G 3/3225

OTHER PUBLICATIONS

Office Action dated May 10, 2022 of the corresponding Taiwan patent application No. 110135621.
(Continued)

*Primary Examiner* — Kenny A Cese
(74) *Attorney, Agent, or Firm* — Chun-Ming Shih; HDLS IPR SERVICES (57) ABSTRACT

A shading correcting method for a real-time image is disclosed and includes following steps: obtaining a real-time image through an image sensor; reading a stored previous image which is time-adjacent to the real-time image; computing an image reference data of the previous image; computing an adjusting parameter in accordance with the image referring data and an equipment reference data of the image sensor; adjusting a gain table based on the adjusting parameter to generate an adjusted gain table, wherein the gain table records multiple compensation values each for compensating each corresponding pixel of the real-time
(Continued)

image; correcting the real-time image in accordance with the adjusted gain table to generate an adjusted image; and, outputting the adjusted image.

10 Claims, 7 Drawing Sheets

(51) Int. Cl.
| | |
|---|---|
| G06T 3/4092 | (2024.01) |
| G06T 3/60 | (2024.01) |
| G06T 5/00 | (2024.01) |
| G06T 5/20 | (2006.01) |
| G06T 5/50 | (2006.01) |
| G06T 5/94 | (2024.01) |
| G06T 7/00 | (2017.01) |
| G06T 7/70 | (2017.01) |
| G06T 7/80 | (2017.01) |
| G06T 11/00 | (2006.01) |
| G06V 10/75 | (2022.01) |

(52) U.S. Cl.
CPC ............. *G06T 5/00* (2013.01); *G06T 5/20* (2013.01); *G06T 5/50* (2013.01); *G06T 5/94* (2024.01); *G06T 7/0002* (2013.01); *G06T 7/70* (2017.01); *G06T 7/80* (2017.01); *G06T 11/00* (2013.01); *G06V 10/751* (2022.01)

(58) Field of Classification Search
CPC ........... G06T 7/70; G06T 7/80; G06T 3/4092; G06T 3/60; G06T 11/00; G06V 10/751
See application file for complete search history.

(56) References Cited

U.S. PATENT DOCUMENTS

| | | | |
|---|---|---|---|
| 2014/0253764 A1 | 9/2014 | Haas et al. | |
| 2015/0365612 A1* | 12/2015 | Wang | H04N 23/843 348/223.1 |
| 2016/0191824 A1* | 6/2016 | Izawa | H04N 23/843 348/251 |
| 2020/0077027 A1* | 3/2020 | Onaka | H04N 23/69 |
| 2020/0120321 A1 | 4/2020 | Tian et al. | |
| 2022/0059029 A1* | 2/2022 | Kishimoto | H04N 5/66 |

OTHER PUBLICATIONS

Office Action dated Nov. 21, 2023 of the corresponding China patent application No. 202111198449.X.

\* cited by examiner

SHADING CORRECTING METHOD AND SHADING CORRECTING DEVICE FOR REAL-TIME IMAGE

CROSS-REFERENCE TO RELATED APPLICATION

This patent application claims the benefit of U.S. Provisional Patent Application No. 63/147,211, filed Feb. 8, 2021, which is incorporated by reference herein.

BACKGROUND OF THE DISCLOSURE

Technical Field

The present disclosure relates to an image correcting method and an image correcting device, and specifically relates to a shading correcting method and a shading correcting device for a real-time image.

Description of Related Art

According to the optical properties of the lens (such as convex lens), the amount of light entering the central position of the lens should be larger than that of the surrounding positions of the lens. As a result, when a device senses external images through an image sensor arranged with this type of lens, the color on the corner positions (i.e., the surrounding positions) of the sensed images may be dark.

To improve the problem mentioned above, a part of the imaging devices on the market may first perform a shading correcting procedure to an inputted image, and then output the corrected image. Such shading correcting procedure may improve the brightness of the corner positions of the image, eliminate the brightness difference between the corner positions and the central position of the image, so as to improve the shadow appeared on the corner positions of the image.

However, the current shading correcting procedure only considers and corrects the brightness of the image, turns out the corrected image may encounter other quality issue(s). For example, after the brightness of the corner positions of the image is improved, the noise of the corner positions of the image may be increased.

Furthermore, the above shading correcting procedure uses a fixed gain value(s) or a fixed gain table to compensate the pixel values of the corner positions of different images. However, the optical properties of different image sensors may be different, or even the image sensors of same type may have shifted lens due to assemble errors. Therefore, the shadow positions appeared on the images generated from different image sensors may be varied. Besides, the user may shoot or sense different images with different contents each time, if a fixed gain value(s) or a fixed gain table is consistently applied to perform the shading correcting procedure to different images captured at different time points or by different image sensors, the corrected result of the shading correcting procedure may not be favorable both in effect and in quality.

SUMMARY OF THE DISCLOSURE

The present disclosure is directed to a shading correcting method and a shading correcting device for a real-time image, that may dynamically adjust a gain table of a shading correcting procedure in accordance with the content of an image, and perform the correction by referencing more than one information, so as to improve the image quality after the correction.

In one of the exemplary embodiments, the shading correcting method for a real-time image of the present disclosure may include following steps:
a) obtaining the real-time image through an image sensor;
b) reading at least one previous image that is time-adjacent to the real-time image;
c) computing an image reference data of the previous image, and computing an adjusting parameter in accordance with the image reference data and an equipment reference data of the image sensor;
d) adjusting multiple compensation values recorded in a gain table in accordance with the adjusting parameter to generate an adjusted gain table, wherein the multiple compensation values are used to compensate multiple pixel points of an image;
e) respectively multiplying the pixel value of each of the pixel points of the real-time image by each of the compensation values in the adjusted gain table to generate a corrected image; and
f) outputting the corrected image.

In one of the exemplary embodiments, the shading correcting device for a real-time image of the present disclosure may include:
a receiving unit connected to an image sensor, configured to receive a real-time image generated from the image sensor;
a storage, configured to store at least one previous image and a gain table, wherein the previous image is time-adjacent to the real-time image, and the gain table records multiple compensation values used to compensate multiple pixel points of an image;
a processor, connected with the receiving unit and the storage, comprising:
a detecting module, configured to detect an equipment reference data of the image sensor;
a computing module, configured to compute an image reference data of the previous image;
an adjusting module, configured to compute an adjusting parameter in accordance with the image reference data and the equipment reference data, and adjust the multiple compensation values recorded in the gain table to generate an adjusted gain table; and
a correcting module, configured to respectively multiply the pixel value of each of the pixel points of the real-time image by each of the compensation values of the adjusted gain table to generate a corrected image; and
an outputting unit, connected to the processor, configured to output the corrected image.

In comparison with related arts, the present disclosure adjusts the compensation value used to correct the real-time image in accordance with the content of the previous image, so as to start performing the correcting procedure before the real-time image is downloaded completely for saving the execution time of the correcting procedure. Besides, the present disclosure corrects the real-time image in accordance with both the content of the previous image and relevant data of the image sensor, so as to increase the quality of the corrected image.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure is about a shading correcting device for a real-time image (referred to as a correcting device hereinafter), the correcting device is used to perform a shading correcting procedure to a real-time image generated or formed by an image sensor, so as to eliminate a corner shadow(s) appeared on the real-time image due to the optical properties of the image sensor. Therefore, the quality of an outputted image may be effectively improved.

Figure 1:
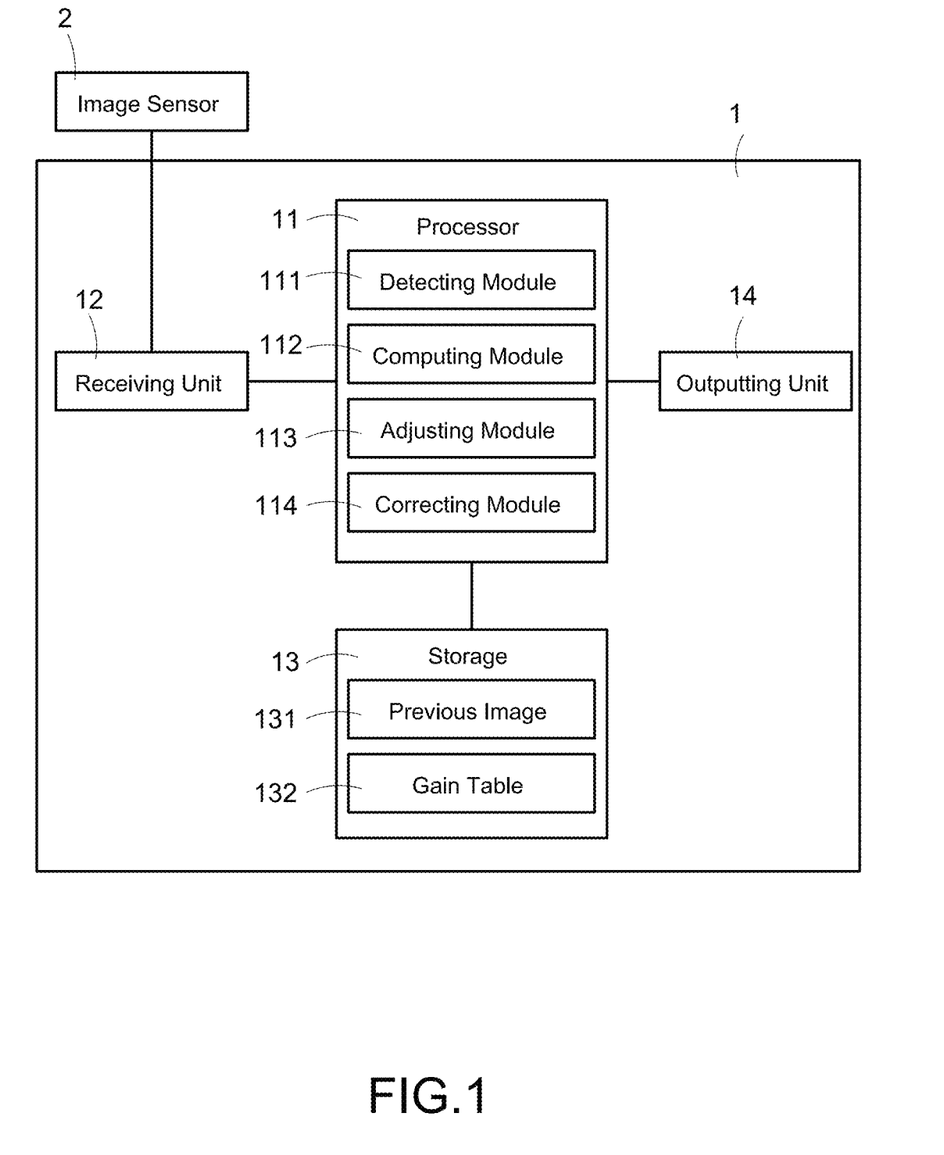
FIG. 1 is a block diagram of a shading correcting device of a first embodiment according to the present disclosure.

Please refer to FIG. 1, which is a block diagram of a shading correcting device of a first embodiment according to the present disclosure. As shown in FIG. 1, a correcting device 1 of the present disclosure mainly includes a processor 11, a receiving unit 12, a storage 13, and an outputting unit 14, wherein the processor 11 is electrically connected with the receiving unit 12, the storage 13, and the outputting unit 14, and configured to integrate and control the data of each of the units 12-14.

In one embodiment, the processor 11 may be implemented by a micro control unit (MCU) or a field programmable gate array (FPGA). The processor 11 records computer readable program codes that are accessible to the processor 11. When executing the computer readable program codes, the processor 11 may implement each function related to the shading correcting procedure of the correcting device 1 of the present disclosure.

On the basis of the functions implemented by the processor 11, the correcting device 1 may virtually create multiple function modules inside the processor 11, including a detecting module 111, a computing module 112, an adjusting module 113, and a correcting module 114 (detailed described in the following). In one of the exemplary embodiments, the detecting module 111, the computing module 112, the adjusting module 113, and the correcting module 114 are software modules implemented by the processor 11 through executing the computer readable program codes, but not limited thereto.

Figure 2:
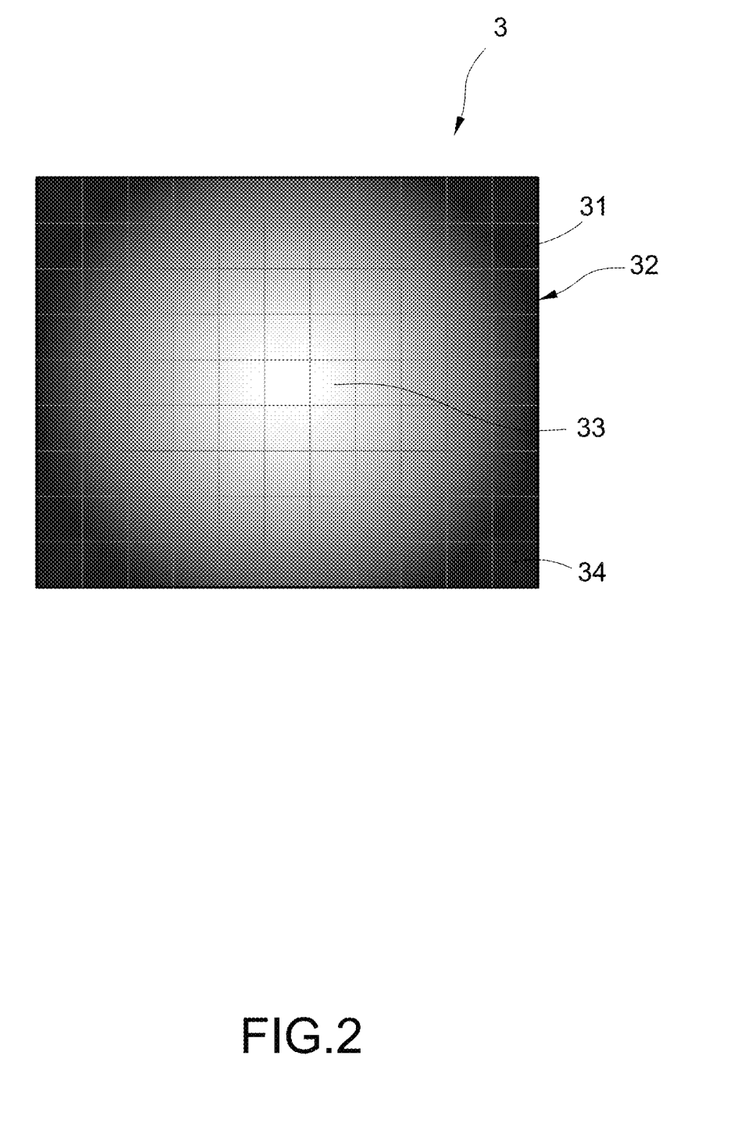
FIG. 2 is a schematic diagram showing a grid correction method.

In one of the exemplary embodiments, the receiving unit 12 may be a connect port, such as a universal serial bus (USB) port, a serial peripheral interface (SPI) port, an I²C port, etc., but not limited thereto. The correcting device 1 connects an external image sensor 2 through the receiving unit 12 to receive and process a real-time image(s) sensed and formed by the image sensor 2, such as to receive a real-time image 3 as shown in FIG. 2.

The image sensor 2 may be a camera, an infrared sensor, a laser sensor, etc. The image sensor 2 is configured to sense external images in real-time and import the sensed images to the correcting device 1 to be analyzed, corrected, and outputted. In one of the exemplary embodiments, the image sensor 2 may be a medical endoscope for being used to sense human body images, but not limited thereto.

The storage 13 may be a hard-drive disk (HDD), a solid-state disk (SSD), a flash memory, a read only memory (ROM), a random-access memory (RAM), a non-volatile memory, etc., but not limited. The storage 13 is used to store a previous image 131 that is time-adjacent to the currently sensed real-time image, and store a gain table 132 that is used to correct the real-time image.

In particular, the gain table 132 records multiple compensation values used to compensate the pixel value of each pixel point in unspecified images. By performing the compensation procedure mentioned above, the correcting device 1 may reduce the brightness difference between the corner area(s) and the central area of an image, so as to eliminate the corner shadow(s) of the image (such as the real-time image).

The gain table 132 is designed in accordance with the physical characteristics of the image sensor 2, and it is a table recorded with fixed values. Therefore, the gain table 132 itself may provide a certain level of correction to the corner shadow of unspecified images. However, the image sensor 2 continuously senses and forms sequential real-time images over time, the gain table 132 with fixed values may not provide same and demanded correction effect for every real-time image. As a result, the processor 11 of the present disclosure may adjust the multiple compensation values in the gain table 132 in accordance with both an image reference data of the previous image 131 and an equipment reference data of the image sensor 2 to generate an adjusted gain table, and then perform the correction to the real-time image currently obtained based on the adjusted gain table, so as to improve the correction ability of the gain table 132.

In particular, the processor 11 detects the equipment reference data of the image sensor 2 which currently connected to the correcting device 1 through the detecting module 111, computes the image reference data of the previous image 131 through the computing module 112, and calculates an adjusting parameter in accordance with the image reference data and the equipment reference data through the adjusting module 113. Also, the adjusting module 113 adjusts the multiple compensation values recorded in the gain table 132 based on the calculated adjusting parameter, so as to generate the adjusted gain table.

In one embodiment, the adjusting parameter is a value greater than 0 and small than or equal to 1. In the scenario that the adjusting parameter is greater than 0 and smaller than or equal to 1, the adjusting parameter may reduce the correction effect of the pre-stored gain table 132. In other embodiment, the adjusting parameter may be a value greater than 1. In the scenario that the adjusting parameter is greater than 1, the adjusting parameter may increase the correction effect of the pre-stored gain table 132. For example, if an adjusting parameter greater than 0 and smaller than or equal to 1 is computed, the adjusting module 113 may add a constant to the adjusting parameter, so the adjusting parameter becomes a value that is greater than 1 and may be used to increase the correction effect of the gain table 132.

In the present disclosure, the processor 11 performs the shading correcting procedure to the real-time image through the adjusted gain table. In particular, the processor 11 respectively multiplies the pixel value of each pixel point in the real-time image by a corresponding one of the multiple compensation values in the adjusted gain table through the correcting module 114, so as to generate the corrected image.

The correcting device 1 may output the corrected image through the outputting unit 14. In one embodiment, the outputting unit 14 may be an image output port, and the correcting device 1 is connected with an external displayer through the outputting unit 14 to display the corrected image. In other embodiment, the outputting unit 14 is a displayer configured on the correcting device 1 for directly displaying the corrected image. However, the above descriptions are only embodiments of the present disclosure, but not limited thereto.

Refer to FIG. 2, which is a schematic diagram showing a grid correction method. The correcting device 1 of the present disclosure may perform the shading correcting procedure to a real-time image 3 through a grid correction method. As shown in FIG. 2, the grid correction method logically cuts the real-time image 3 into multiple grids 31 to constitute a grid matrix, wherein each of the grids 31 respectively covers one pixel point or covers a pixel collection 32 consisted of multiple pixel points. For example, if the resolution of the real-time image 3 is 800×800 (i.e., 640000 pixel points are included), and the grid matrix is a 100×100 matrix (i.e., 10000 grids 31 are included), then each of the grids 31 may respectively include one pixel collection 32 consisted of 8×8 pixel points (i.e., 64 pixel points are included in each grid 31). The brightness and the color of multiple position-adjacent pixel points will be same or similar. Accordingly, by using the grid correction method, the multiple pixel points within same grid 31 are corrected based on same or interpolated compensation value.

As disclosed in FIG. 2, the real-time image 3 includes a corner shadow(s), which means the brightness of a central area 33 of the real-time image 3 is brighter than that of at least one corner area 34 of the real-time image 3. In the present disclosure, the correcting device 1 may correct one or more pixel points at the central area 33 in accordance with a lower compensation value, where the smallest value of the used compensation value is 1, and correct one or more pixel points at the corner area(s) 34 in accordance with a higher compensation value, so as to eliminate the corner shadow.

Figure 3:
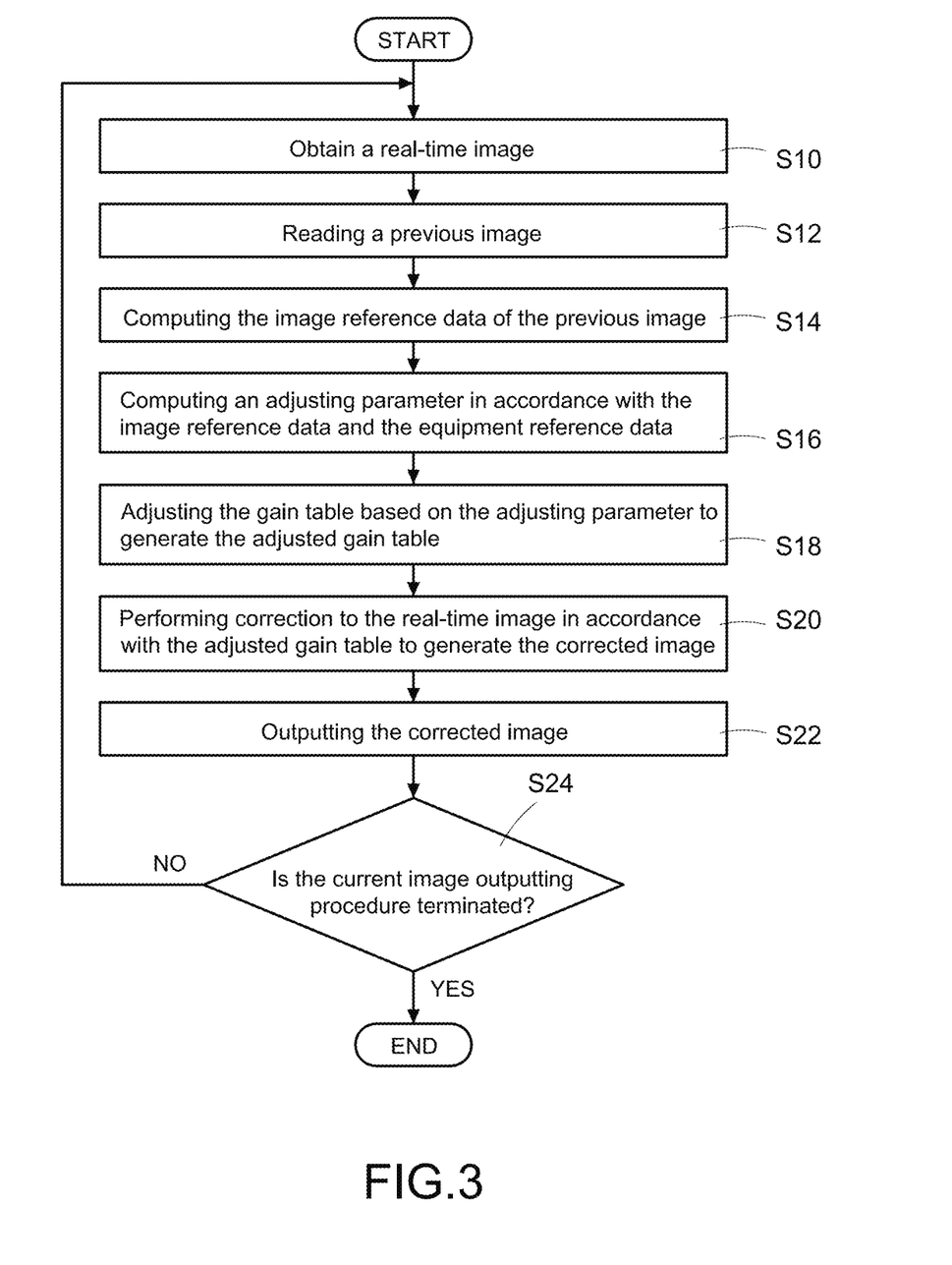
FIG. 3 is a flowchart of a shading correcting method of a first embodiment according to the present disclosure.

Please refer to FIG. 1 through FIG. 3 at the same time, wherein FIG. 3 is a flowchart of a shading correcting method of a first embodiment according to the present disclosure. The present disclosure discloses a shading correcting method for real-time image (referred to as the correcting method hereinafter), the correcting method is incorporated with the correcting device 1 as shown in FIG. 1, and used to perform the correction for the shadow appeared on the corner area(s) of the real-time image 3.

After the correcting device 1 is activated, the processor 11 may obtain a real-time image 3 from the image sensor 2 connected to the correcting device 1 (step S10), also, the processor 11 read a previous image 131 that is time-adjacent to the real-time image 3 currently obtained from the storage 13 (step S12), and compute the image reference data of the previous image 131 (step S14). The previous image 131 is another real-time image 3 that the correcting device 1 sampled during a previous cycle, and the previous image 131 is temporarily stored to the storage 13 after being received by the receiving unit 12. In particular, the image sensor 2 senses one real-time image 3 in every cycle, the correcting device 1 corrects the real-time image 3 of each cycle, and the real-time image 3 of each cycle is temporarily stored to the storage 13 to become a correction basis for the real-time image 3 sensed in a next cycle.

In one embodiment, the image reference data may be, for example but not limited to, a brightness difference between the central area 33 and the corner area(s) 34 of the previous image 131, a color unsaturation value of the multiple pixel values of the previous image 131, etc. The color unsaturation value may be a computation result of an unsaturation value of any color of red, green, blue, or any combination thereof.

In one embodiment, the processor 11 may read multiple images that are time-adjacent to the real-time image 3 currently processed from the storage 13 in the step S12, and calculate an average value of the image reference data of the multiple images in the step S14. Through performing the following computation and correction based on the average value of multiple images, the present disclosure may obtain stable information, which can be prevented from obtaining wrong parameter due to only one image with an instant error.

In the present disclosure, the processor 11 may detect the equipment reference data of the image sensor 2 connected with the correcting device 1, and compute an adjusting parameter in accordance with the image reference data and the equipment reference data (step S16). In one embodiment, the adjusting parameter is a value greater than 0 and smaller than or equal to 1, and is used to reduce the correction effect of the pre-stored gain table 132. In other embodiment, the adjusting parameter is a value greater than 1, and is used to increase the correction effect of the pre-stored gain table 132.

After the step S16, the processor 11 reads the pre-stored gain table 132 from the storage 13, and adjusts the gain table 132 based on the adjusting parameter to generate the adjusted gain table (step S18). As mentioned above, the gain table 132 records multiple compensation values used to compensate the pixel value of the multiple pixel points in the real-time image 3. In the step S18, the processor 11 multiplies each compensation value in the gain table 132 by the adjusting parameter computed in the step S16 to generate the adjusted gain table.

After the step S18, the processor 11 may perform the correction to the real-time image 3 in accordance with the adjusted gain table, so as to generate the corrected image (step S20). After the step S20, the correcting device 1 may output the corrected image through the outputting unit 14 (step S22).

As mentioned above, the correcting device 1 of the present disclosure corrects the real-time image 3 through the grid correction method. As a result, the total amount of the multiple compensation values in the adjusted gain table should match with the image resolution of the real-time image 3. In the step S20, the processor 11 respectively multiplies the pixel value of each of the pixel points in the real-time image 3 by a corresponding one of the compensation values in the adjusted gain table, so as to generate the corrected image.

Figure 4:
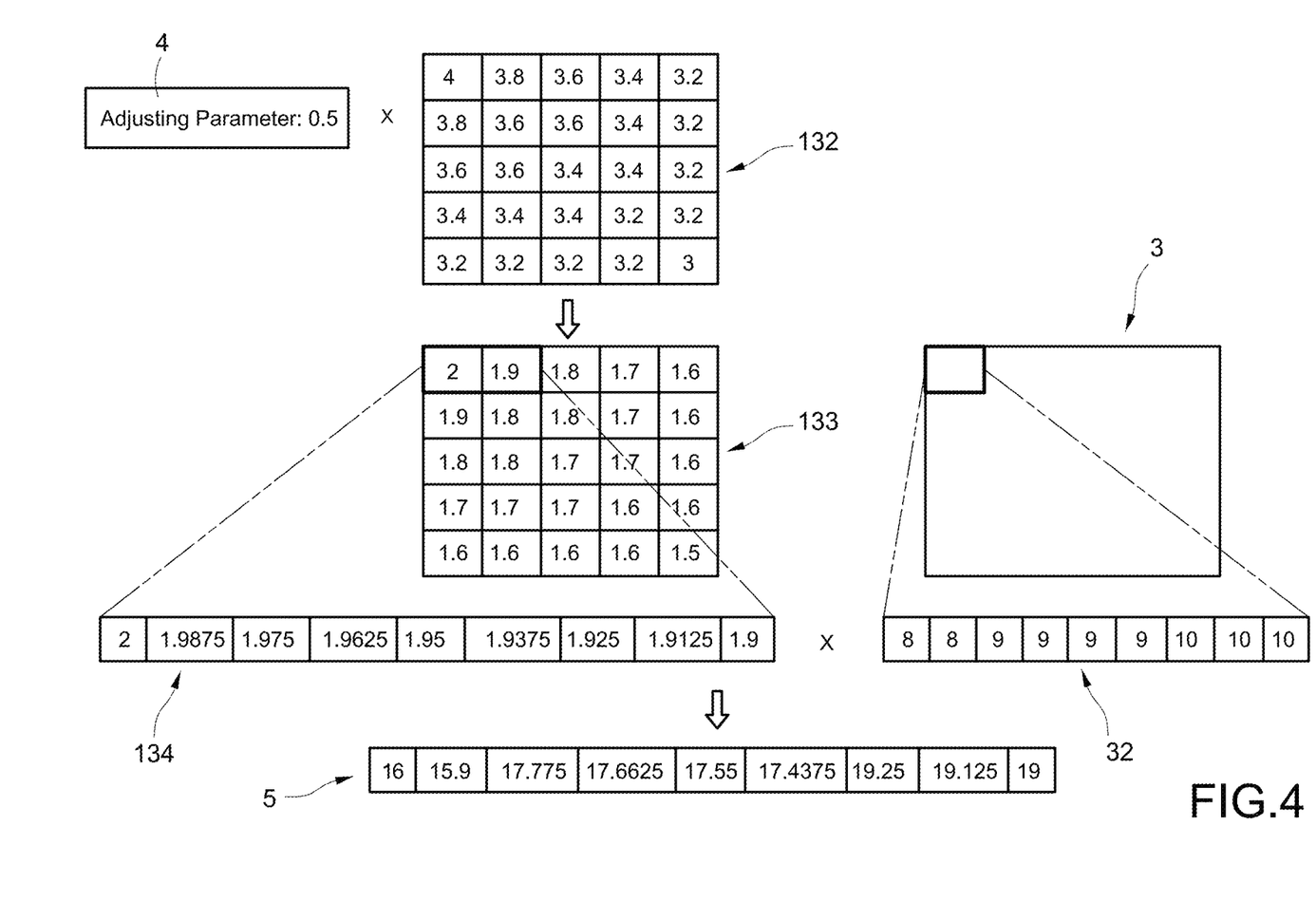
FIG. 4 is a schematic diagram showing an image correction of a first embodiment according to the present disclosure.

Please refer to FIG. 4 at the same time, which is a schematic diagram showing an image correction of a first embodiment according to the present disclosure. In the embodiment of FIG. 4, the adjusting parameter 4 is illustrated as 0.5. In the step S18, the processor 11 may respectively multiply each compensation value in the gain table 132 by the adjusting parameter 4 to generate an adjusted gain table 133. As shown in FIG. 4, each of the compensation values in the adjusted gain table 133 is half to each of the original compensation values in the gain table 132 due to the adjusted parameter 4 (which is 0.5). The adjusting parameter 4 is generated based on the content of the previous image 131, in other words, the present disclosure adjusts the gain table 132 of performing the shading correcting procedure based on the content of the previous image 131, so as to generate the adjusted gain table 133.

Refer back to FIG. 3. After the step S22, the processor 11 determines whether the current image outputting procedure is terminated or not (step S24). For example, the processor 11 determines whether the image sensor 2 stops sensing images, or whether the correcting device 1 is turned off. Before the image outputting procedure is terminated, the processor 11 re-executes the step S10 through the step S22 to continuously obtain the next image, perform the shading correcting procedure to the next image, and output the corrected image.

Figure 5:
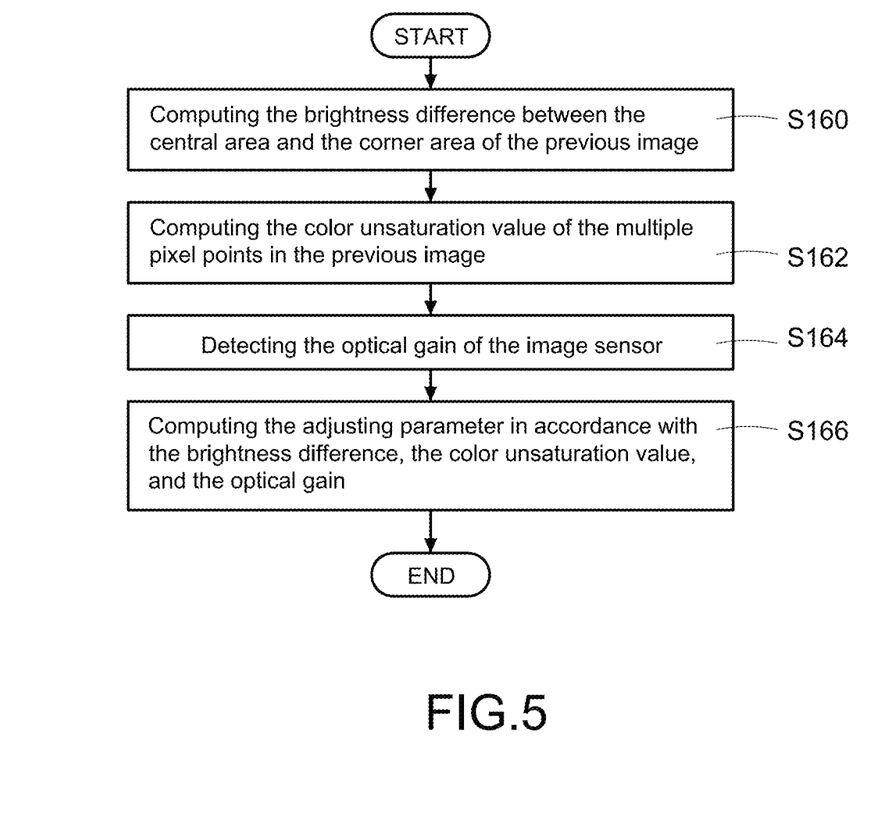
FIG. 5 is a flowchart of generating an adjusting parameter of a first embodiment according to the present disclosure.

Please refer to FIG. 5 at the same time, wherein FIG. 5 is a flowchart of generating an adjusting parameter of a first embodiment according to the present disclosure. FIG. 5 is used to interpret how the correcting device 1 generates the adjusting parameter 4 for adjusting the gain table 132 in the step S16 of FIG. 3.

As shown in FIG. 5, when generating the adjusting parameter 4, the correcting device 1 reads the previous image 131 from the storage 13 by the processor 11, computes the brightness difference between the central area 33 and the corner area(s) 34 of the previous image 131 (step S160), and computes the color unsaturation value of the multiple pixel points in the previous image 131 (step S162). Also, the processor 11 detects an optical of the image sensor 2 connected with the correcting device 1 (step S164). Finally, the processor 11 may compute the adjusting parameter 4 in accordance with the brightness difference, the color unsaturation value, and the optical gain (step S166), wherein the brightness difference and the adjusting parameter 4 are related in a positive trend, the color unsaturation value and the adjusting parameter 4 are related in a positive trend, and the optical gain and the adjusting parameter 4 are related in an opposite trend. In other words, when the brightness difference and/or the color unsaturation value becomes greater, the adjusting parameter 4 becomes greater too; when the optical gain becomes greater, the adjusting parameter 4 becomes smaller (detailed description in the following).

It should be mentioned that the above steps S160, S162, and S164 do not have a necessary execution order. More specific, the processor 11 may execute the steps S160, S162, and S164 in an arbitrary order for respectively obtaining the brightness difference, the color unsaturation value, and the optical gain. Otherwise, the processor 11 may execute the steps S160, S162, and S164 simultaneously through multiplexing regardless the step order disclosed in FIG. 5.

In one of the exemplary embodiments, the processor 11 computes the adjusting parameter 4 through a first formula disclosed below:

Adjusting Parameter=Normalized Value of Brightness Difference×Normalized Value of Color Unsaturation Value×Normalized Value of Optical Gain.

As the example shown in FIG. 2, the processor 11, in the step S160 of FIG. 4, respectively obtains a first brightness value of the central area 33 of the previous image 131 and a second brightness value of the corner area 34 of the previous image 131, and computes a difference between the first brightness value and the second brightness value to be the brightness difference.

In one of the exemplary embodiments, the central area 33 indicates the pixel collection 32 (the sum or the average of multiple pixel values) at a position near a default center of the image 3, and the corner area 34 indicates the pixel collection 32 (the sum or the average of multiple pixel values) at a pre-defined position near the corner of the image 3 that may easily appear a dark shadow. In other embodiment, the correcting device 1 may locate the corner area 34 at a position having serious shading problem and needs to be corrected, but not limited thereto. Before performing the shading correcting procedure, the correcting device 1 may pre-locate the central area 33 and the corner area 34 (for example, to set the serial number of a designated pixel collection 32, the serial number of the grid 31, the coordinates of the position, etc.), so the processor 11 may compute the brightness difference.

The processor 11 in the step S160 may perform a normalization process to the brightness difference; therefore, the brightness difference is transformed into a value between 0 and 1 to be the normalized value of brightness difference used in the first formula. In particular, the processor 11 may perform the normalization process to the brightness difference through a conditional formula disclosed below:

$$\text{Normalized Value of Brightness Difference} = \begin{cases} 1, & n_1 \geq n_{1max} \\ \frac{\exp(n_1) - \exp(n_{1min})}{\exp(n_{1max}) - \exp(n_{1min})}, & n_{1min} < n_1 < n_{1max} \\ 0, & n_1 \leq n_{1min} \end{cases}$$

Wherein, $n_1$ indicates the brightness difference, $n_{1max}$ indicates a maximum threshold of the brightness difference (such as three times), $n_{1min}$ indicates a minimum threshold of the brightness difference (such as one time), exp ( ) indicates an exponential function on the basis of e. By using the above conditional formula, no matter what the brightness difference between the central area 33 and the corner area 34 of the previous image 131 is, the processor 11 may transform the brightness difference into a value that is within 0 to 1, for the ease of computing the adjusting parameter 4.

The color unsaturation value indicates the vividness of the image. Taking a medical endoscope as the image sensor 2 for an example, the medical endoscope is used to sense the images of human body, which mostly construed in color of red. Therefore, the greater the red value of the multiple pixel points in the previous image 131, the smaller the computed adjusting parameter is. As a result, the corrected image may be prevented from color saturation caused due to the great red color of the real-time image.

For example, the greatest color depth of the real-time image may be only 8 bits, which means the color saturation value of each pixel point of one real-time image is 255. If the red value of one pixel point in one real-time image is 200 and becomes 260 after the correction; however, the red value of this pixel point can only be presented as 255. If one real-time image includes an entire image area that has the red value exceeding the saturation value, when being displayed, the entire image area will be displayed as the saturation value of 255. Therefore, the whole image area is unidentifiable.

More specific, the processor 11 may calculate the color unsaturation value in accordance with a statistical manner. For example, if hundred pixel points are sampled from the real-time image 3, wherein eighty of the pixel points have the red value lower than or equal to a preset threshold (i.e., twenty of them have the red value higher than the preset threshold), the color unsaturation value of the real-time image 3 may be calculated as 0.8.

In one of the exemplary embodiments, the processor 11 in the step S162 may perform a normalization process to the color unsaturation value; therefore, the color unsaturation value is transformed into a value between 0 and 1 to be the normalized value of color unsaturation value used in the first formula. In particular, the processor 11 may perform the normalization process to the color unsaturation value through a conditional formula disclosed below:

$$\text{Normalized Value of Color Unsaturation Value} = \frac{\text{Total Number of Unsaturated Pixel Points}}{\text{Total Number of Sampled Pixel Points}}.$$

Wherein, the total number of sampled pixel points indicates the total number of the pixel points sampled from the previous image 131 in the statistical procedure for the color unsaturation value, the total number of unsaturated pixel points indicates the total number of the sampled pixel points whose color value is lower than or equal to the preset threshold. By using the above conditional formula, no matter what the color unsaturation value of the multiple pixel points in the previous image 131 is, the processor 11 may transform the color unsaturation value into a value that is within 0 to 1, for the ease of computing the adjusting parameter 4.

The optical gain is a magnification rate of incoming light of the image sensor 2. A greater optical gain causes a greater incoming light of the image sensor 2; hence, the brightness of the formed real-time image 3 will be higher. Therefore, the adjusting parameter 4 doesn't have to be large. In other words, the optical gain and the adjusting parameter 4 are related in an opposite trend.

Taking the medical endoscope as an example, the front end of the medical endoscope may be configured with a control knob for the user to manually adjust the optical gain, such as one time, two times, three times, . . . , sixteen times, etc., but not limited thereto. Since the magnification rate and the incoming light of the image sensor 2 are related in a positive trend, the correcting device 1 of the present disclosure may sense the current magnification rate of the image sensor 2 through the processor 11, and directly use the current magnification rate of the image sensor 2 as the optical gain.

In one of the exemplary embodiments, the processor 11 in the step S164 may perform a normalization process to the optical gain; therefore, the optical gain is transformed into a value between 0 and 1 to be the normalized value of optical gain used in the first formula. In particular, the processor 11 may perform the normalization process to the optical gain through a conditional formula disclosed below:

$$\text{Normalized Value of Optical Gain} = \begin{cases} 1, & n_2 \leq n_{2min} \\ \frac{n_{2max} - n_2}{n_{2max} - n_{2min}}, & n_{2min} < n_2 < n_{2max} \\ 0, & n_2 \geq n_{2max} \end{cases}.$$

Wherein, $n_2$ indicates the optical gain, $n_{2max}$ indicates a maximum threshold of the optical gain (such as sixteen times), $n_{2min}$ indicates a minimum threshold of the optical gain (such as one time), wherein both the maximum threshold and the minimum threshold of the optical gain may be adjusted dynamically according to the image sensor 2, not limited to the above conditions. By using the above conditional formula, no matter what the optical gain of the image sensor 2 is (i.e., no matter what the magnification rate is indicated by the control knob), the processor 11 may transform the optical gain into a value that is within 0 to 1, for the ease of computing the adjusting parameter 4.

It should be mentioned that the correcting device 1 and the correcting method of the present disclosure are used to correct the shading part of the real-time image 3 in order to increase the brightness of the corner area 34 on the real-time image 3, so as to reduce the brightness difference between the corner area 34 and the central area 33 of the real-time image 3. Therefore, when performing the shading correcting procedure to the real-time image 3, the correcting method of the present disclosure may further perform an amending procedure to prevent the pixel value of each pixel point of the real-time image 3 from becoming smaller.

In another aspect, the correcting method of the present disclosure uses the grid correction method, wherein the more the amount of the grids, the more compensation values are needed. Therefore, the correcting method of the present disclosure may perform a processing procedure, which may use a small amount of compensation values to compensate all pixel points (or all the pixel collections 32) of the real-time image 3.

Figure 6:
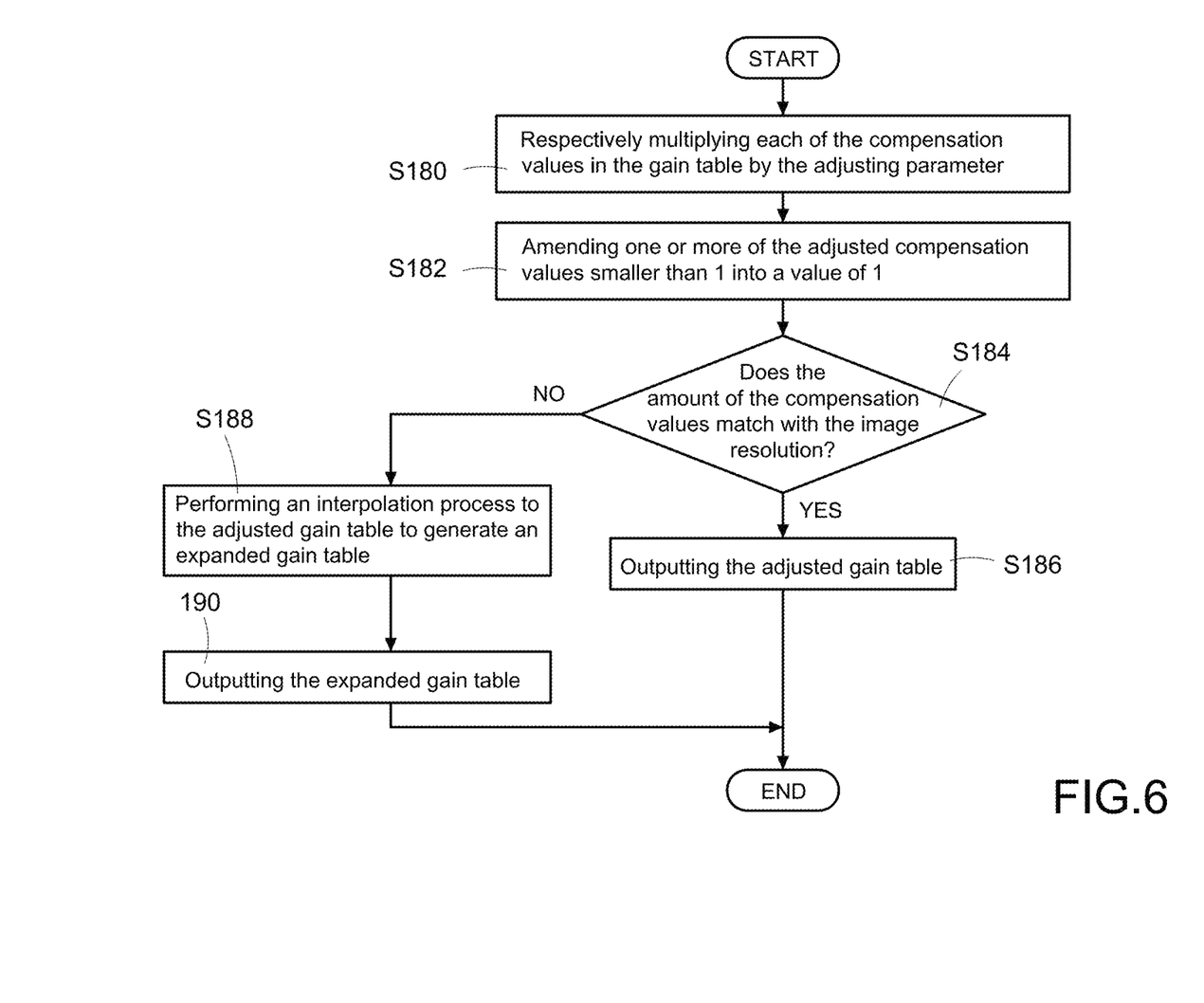
FIG. 6 is a flowchart of adjusting a gain table of a first embodiment according to the present disclosure.

Please refer to FIG. 6, which is a flowchart of adjusting a gain table of a first embodiment according to the present disclosure. FIG. 6 is used to interpret how the processor 11 performs the amending procedure and the processing procedure as mentioned above in the step S18 of FIG. 3.

As shown in FIG. 6, after the adjusting parameter 4 is computed, the processor 11 may read the pre-stored gain table 132 from the storage 3, and respectively multiply each of the compensation values in the gain table 132 by the adjusting parameter 4 (step S180), so as to generate a plurality of adjusted compensation values. Next, the processor 11 amends one or more of the adjusted compensation values smaller than 1 into a value of 1 (step S182), and outputs the adjusted gain table after the amendment. Through the above steps, the pixel value of all the pixel points in the corrected image may be prevented from getting smaller after the correction performed to the real-time image 3.

Figure 7:
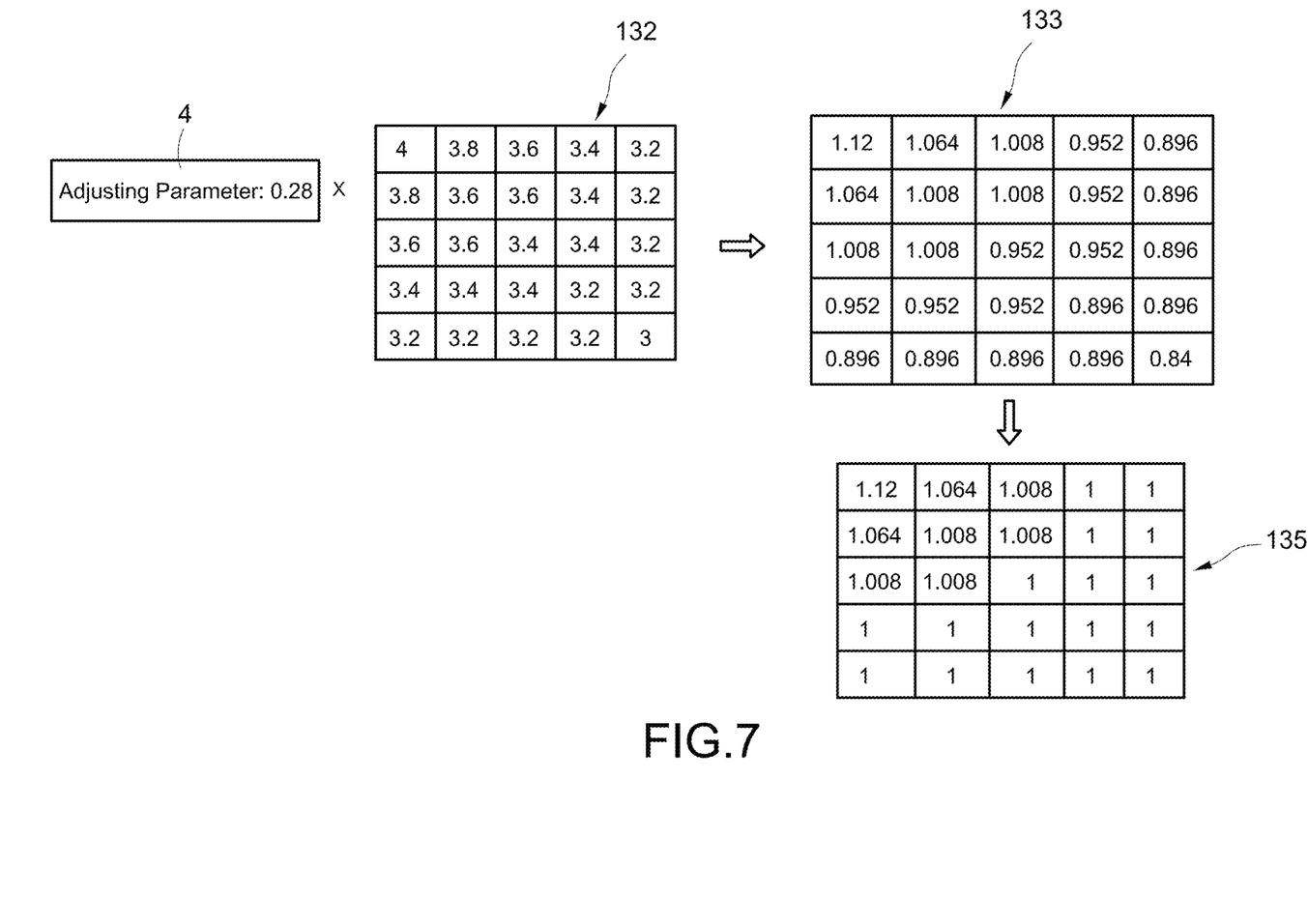
FIG. 7 is a schematic diagram of adjusting a gain table of a first embodiment according to the present disclosure.

Please refer to FIG. 7 at the same time, wherein FIG. 7 is a schematic diagram of adjusting a gain table of a first embodiment according to the present disclosure. As shown in FIG. 7, after the adjusting parameter 4 is computed (the adjusting parameter 4 in FIG. 7 is example as 0.28), the correcting device 1 multiplies the pre-stored gain table 132 (a 5×5 gain table is depicted in FIG. 7) by the adjusting parameter 4 to generate the adjusted gain table 133.

In the example of FIG. 7, a part of the adjusted compensation values in the adjusted gain table 133 is smaller than 1. If the correcting device 1 directly uses the adjusted gain table 133 to correct the real-time image 3, the pixel value of a part of the pixel points will become smaller after the correction. Therefore, the technical effect of reducing the brightness difference between the central area 33 and the corner area 34 of the real-time image 3 may not be reached.

According to the above problem, the correcting method of the present disclosure amends all the adjusted compensation values smaller than 1 in the adjusted gain table 133 into a value of 1, so as to generate an amended gain table 135 (wherein all the adjusted compensation values that is greater than or equal to 1 may be remained). If the correcting device 1 performs the correction to the real-time image 3 based on the amended gain table 135, the corrected image won't become darker under any situation.

Please refer back to FIG. 6. In order to save the storing space of the correcting device 1, the correcting device 1 may use a gain table 132 with a small size. In particular, the amount of the multiple compensation values in the gain table 132 may be less than the resolution of the real-time image 3 being corrected. In other words, the amount of the multiple compensation values in the gain table 132 may be less than the amount of the pixel points or the pixel collections 32 of the real-time image 3. Under such circumstance, the correcting device 1 needs to expand the gain table 132 before performing the correction to the real-time image 3. Through increasing the amount of the multiple compensation values in the gain table 132, the correcting device 1 may ensure that every pixel point (or every pixel collection 32) of the real-time image 3 has a corresponding compensation value.

As shown in FIG. 6, after the step S182, the processor 11 determines whether the amount of the multiple compensation values in the adjusted gain table 133 matches with the image resolution of the real-time image (step S184).

For example, if the adjusted gain table 133 is a 400×400 matrix, and the image resolution of the real-time image 3 is 400×400, the processor 11 may determine that the amount of the multiple compensation values in the adjusted gain table 133 matches with the image resolution of the real-time image in the step S184. For another example, if the adjusted gain table 133 is a 50×50 matrix, and the image resolution of the real-time image 3 is 400×400, the processor 11 may determine that the amount of the multiple compensation values in the adjusted gain table 133 is unmatched with the image resolution of the real-time image 3 in the step S184. Therefore, the processor 11 needs to expand the size of the adjusted gain table 133 by eight times, so that every pixel point (or every pixel collection 32) of the real-time image 3 may have a corresponding compensation value from the gain table after expansion.

It should be mentioned that the size of the adjusted gain table 133, the size of the gain table 132, and the size of the amended gain table 135 are all the same.

If the amount of the multiple compensation values in the adjusted gain table 133 is determined to be matched with the image resolution of the real-time image 3 in the step S184, the processor 11 directly outputs the adjusted gain table 133 generated in the step S180 (step S186). Therefore, the processor 11 may perform the correction to the real-time image 3 based on the adjusted gain table 133 in the step S20 of FIG. 3.

If the amount of the multiple compensation values in the adjusted gain table 133 is determined to be unmatched with the image resolution of the real-time image 3, it may indicate that the size of the adjusted gain table 133 is too small. In this case, the processor 11 performs an interpolation process to the adjusted gain table 133 in accordance with the resolution of the real-time image 3, so as to generate an expanded gain table (such as the expanded gain table 134 shown in FIG. 4) (step S188). In particular, in the step S188, the processor 11 may perform the interpolation process to the adjusted gain table 133 in accordance with any of the Linear Interpolation, the Polynomial Interpolation, the Gaussian Interpolation, and the Wavelet Interpolation, so as to expand the content of the adjusted gain table 133, but not limited thereto.

After the step S188, the processor 11 outputs the expanded gain table 134 (step S190); therefore, the processor 11 performs the correction to the real-time image 3 based on the expanded gain table 134 in the step S20 of FIG. 3. More specific, the amount of the multiple compensation values in the expanded gain table 134 generated in the step S188 is greater than that of the multiple compensation values in the adjusted gain table 133 generated in the step S180, and the amount of the multiple compensation values in the expanded gain table 134 matches with the image resolution of the real-time image 3.

The interpolation process discussed above is to generate multiple expansion compensation values that are linearly increasing or linearly decreasing between any two adjacent compensation values, so as to expand the total amount of the compensation values to a demanded amount. Therefore, the size of the adjusted gain table 133 after expansion may match with the image resolution of the real-time image 3.

As shown in FIG. 4, if a difference between the size of the adjusted gain table 133 and the resolution of the real-time image 3 is eight times, the processor 11 may perform the interpolation process to the adjusted gain table 133 to generate the expanded gain table 134, wherein the size of the expanded gain table 134 will be eight times to the size of the adjusted gain table 133 and match with the resolution of the real-time image 3.

To expand the amount to eight times, the interpolation process needs to generate seven compensation values that are linearly increasing or linearly decreasing between any two adjacent compensation values in the adjusted gain table 133. In the embodiment of FIG. 4, the processor 11 linearly generates multiple compensation values including "1.9875", "1.975", "1.9625", "1.95", "1.9375", "1.925", and "1.9125", wherein the difference between each two compensation values is 0.0125. In the shading correcting procedure, the processor 11 respectively multiplies every pixel point (or each pixel collection 32) of the real-time image 3 by a corresponding compensation value recorded at a corresponding grid of the expanded gain table 134, so as to generate the corrected image 5.

The correcting device 1 and the correcting method of the present disclosure may correct the shadow appeared on the corner area(s) 34 of the real-time image 3, and consider the relevant information of the previous image 131 and the image sensor 2 while performing the correction. Therefore, the time cost of the correction may be saved, and the quality of the corrected image may be improved.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A shading correcting method for a real-time image, comprising:
    a) obtaining the real-time image through an image sensor;
    b) reading at least one previous image that is time-adjacent to the real-time image;
    c) computing an image reference data of the previous image, and computing an adjusting parameter in accordance with the image reference data and an equipment reference data of the image sensor;
    d) adjusting multiple compensation values recorded in a gain table in accordance with the adjusting parameter to generate an adjusted gain table, wherein the multiple compensation values are used to compensate multiple pixel points of an image;
    e) respectively multiplying the pixel value of each of the pixel points of the real-time image by each of the compensation values in the adjusted gain table to generate a corrected image; and
    f) outputting the corrected image;

wherein the step d) comprises:
  d1) determining whether an amount of the multiple compensation values matches with an image resolution of the real-time image;
  d2) determining that the amount of the multiple compensation values matches with the image resolution of the real-time image and outputting the adjusted gain table;
  d3) determining that the amount of the multiple compensation values is unmatched with the image resolution of the real-time image and performing an interpolation process to the adjusted gain table based on the image resolution to generate an expanded gain table, wherein an amount of the multiple compensation values of the expanded gain table is greater than the amount of the multiple compensation values of the adjusted gain table; and
  d4) outputting the expanded gain table.

2. The shading correcting method in claim 1, wherein the step c) comprises:
  c1) calculating a brightness difference between a central area and a corner area of the previous image;
  c2) calculating a color unsaturation value of multiple pixel points of the previous image;
  c3) obtaining an optical gain of the image sensor; and
  c4) computing the adjusting parameter in accordance with the brightness difference, the color unsaturation value, and the optical gain, wherein the brightness difference and the adjusting parameter are related in a positive trend, the color unsaturation value and the adjusting parameter are related in the positive trend, and the optical gain and the adjusting parameter are related in an opposite trend.

3. The shading correcting method in claim 2, wherein the step c) comprises computing the adjusting parameter in accordance with a first formula:

adjusting parameter=normalized value of brightness difference×normalized value of color unsaturation value×normalized value of optical gain, wherein the normalized value of brightness difference is:

$$\begin{cases} 1, & n_1 \geq n_{1max} \\ \dfrac{\exp(n_1) - \exp(n_{1min})}{\exp(n_{1max}) - \exp(n_{1min})}, & n_{1min} < n_1 < n_{1max} \\ 0, & n_1 \leq n_{1min} \end{cases}$$

the normalized value of color unsaturation value is:

$$\dfrac{\text{total number of unsaturated pixel points}}{\text{total number of sampled pixel points}},$$

the normalized value of optical gain is:

$$\begin{cases} 1, & n_2 \leq n_{2min} \\ \dfrac{n_{2max} - n_2}{n_{2max} - n_{2min}}, & n_{2min} < n_2 < n_{2max} \\ 0, & n_2 \geq n_{2max} \end{cases}$$

wherein $n_1$ is the brightness difference, $n_{1max}$ is a maximum threshold of the brightness difference, $n_{1min}$ is a minimum threshold of the brightness difference, $\exp(\ )$ is an exponential function on the basis of e, $n_2$ is the optical gain, $n_{2max}$ is a maximum threshold of the optical gain, $n_{2min}$ is a minimum threshold of the optical gain.

4. The shading correcting method in claim 2, wherein the step d) comprises:
  d5) respectively multiplies each of the compensation values of the gain table by the adjusting parameter to generate multiple adjusted compensation values;
  d6) amending one or more of the adjusted compensation values smaller than 1 into a value of 1; and
  d7) generating an adjusted gain table in accordance with the multiple adjusted compensation values after the step d6), wherein the step e) comprises correcting the real-time image based on the adjusted gain table to generate the corrected image.

5. The shading correcting method in claim 2, wherein the amount of the multiple compensation values of the expanded gain table matches with the image resolution.

6. A shading correcting device for a real-time image, comprising:
  a receiving unit connected to an image sensor, configured to receive a real-time image generated from the image sensor;
  a storage, configured to store at least one previous image and a gain table, wherein the previous image is time-adjacent to the real-time image, and the gain table records multiple compensation values used to compensate multiple pixel points of an image;
  a processor, connected with the receiving unit and the storage, comprising:
  a detecting module, configured to detect an equipment reference data of the image sensor;
  a computing module, configured to compute an image reference data of the previous image;
  an adjusting module, configured to compute an adjusting parameter in accordance with the image reference data and the equipment reference data, and adjust the multiple compensation values recorded in the gain table to generate an adjusted gain table; and
  a correcting module, configured to respectively multiply the pixel value of each of the pixel points of the real-time image by each of the compensation values of the adjusted gain table to generate a corrected image; and
  an outputting unit, connected to the processor, configured to output the corrected image;
  wherein the adjusting module is configured to determine that an amount of the multiple compensation values of the adjusted gain table matches with an image resolution of the real-time image and output the adjusted gain table, and to determine that the amount of the multiple compensation values of the adjusted gain table is unmatched with the image resolution of the real-time image and perform an interpolation process to the adjusted gain table based on the image resolution to generate an expanded gain table, wherein an amount of the multiple compensation values of the expanded gain table is greater than the amount of the multiple compensation values of the adjusted gain table;
  wherein the correcting module is configured to correct the real-time image in accordance with the expanded gain table to generate the corrected image.

7. The shading correcting device in claim 6, wherein the equipment reference data comprises an optical gain of the image sensor, the image reference data comprises a brightness difference between a central area and a corner area of the previous image and comprises a color unsaturation value of multiple pixel points of the previous image, wherein the brightness difference and the adjusting parameter are related in a positive trend, the color unsaturation value and the adjusting parameter are related in the positive trend, and the optical gain and the adjusting parameter are related in an opposite trend.

8. The shading correcting device of claim 7, wherein the adjusting module computes the adjusting parameter in accordance with a first formula:

adjusting parameter=normalized value of brightness difference×normalized value of color unsaturation value× normalized value of optical gain, wherein the normalized value of brightness difference is:

$$\begin{cases} 1, & n_1 \geq n_{1max} \\ \dfrac{\exp(n_1) - \exp(n_{1min})}{\exp(n_{1max}) - \exp(n_{1min})}, & n_{1min} < n_1 < n_{1max} \\ 0, & n_1 \leq n_{1min} \end{cases}$$

the normalized value of color unsaturation value is:

$$\dfrac{\text{total number of unsaturated pixel points}}{\text{total number of sampled pixel points}},$$

the normalized value of optical gain is:

$$\begin{cases} 1, & n_2 \leq n_{2min} \\ \dfrac{n_{2max} - n_2}{n_{2max} - n_{2min}}, & n_{2min} < n_2 < n_{2max} \\ 0, & n_2 \geq n_{2max} \end{cases}$$

wherein $n_1$ is the brightness difference, $n_{1max}$ is a maximum threshold of the brightness difference, nimin is a minimum threshold of the brightness difference, exp( ) is an exponential function on the basis of e, $n_2$ is the optical gain, $n_{2max}$ is a maximum threshold of the optical gain, $n_{2min}$ is a minimum threshold of the optical gain.

9. The shading correcting device of claim 7, wherein the adjusting module is configured to respectively multiply each of the compensation values of the gain table by the adjusting parameter to generate multiple adjusted compensation values, and to amend one or more of the adjusted compensation values smaller than 1 into a value of 1, and to generate an amended gain table in accordance with the multiple adjusted compensation value, wherein the correcting module is configured to correct the real-time image in accordance with the amended gain table to generate the corrected image.

10. The shading correcting device of claim 7, wherein the amount of the multiple compensation values of the expanded gain table matches with the image resolution.

* * * * *